Oct. 31, 1933.  W. KOLHÖRSTER  1,933,063
DEVICE FOR DETERMINING THE PERCENTAGE OF POTASSIUM
IN CHAMBERS CONTAINING POTASSIUM
Filed Aug. 30, 1929
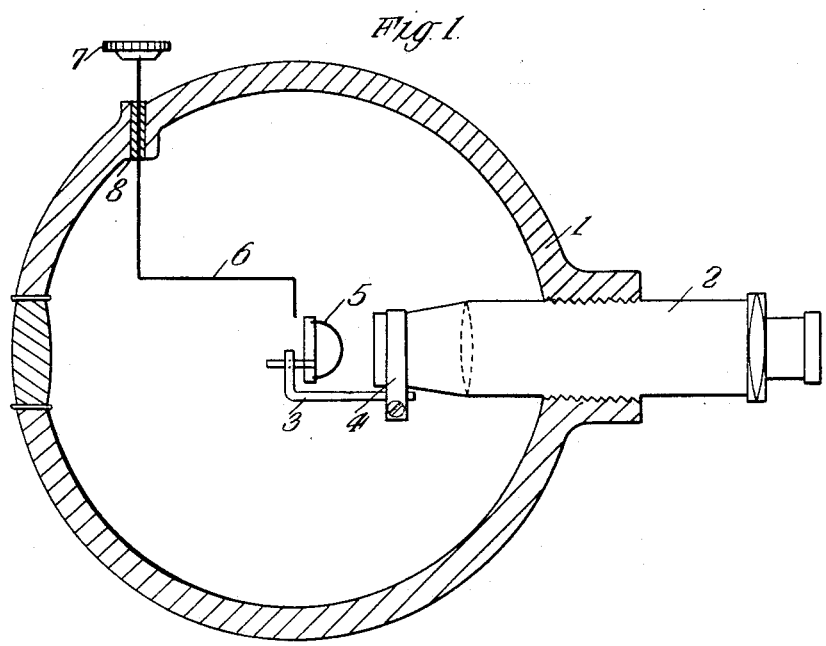
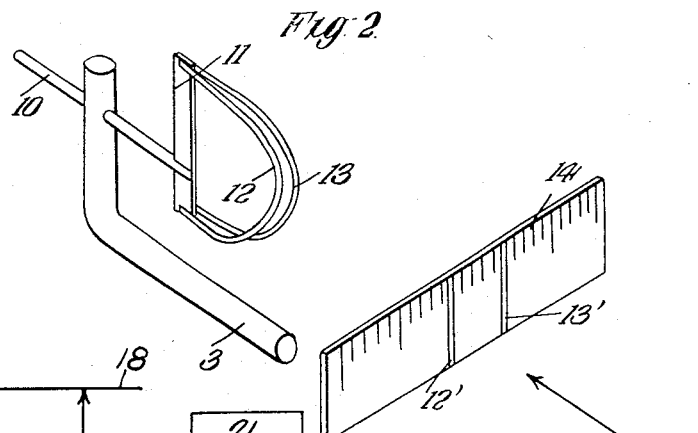
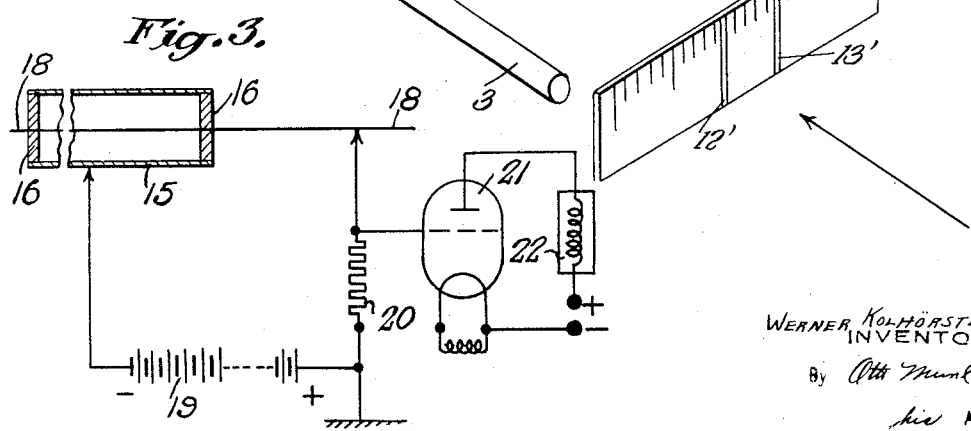
WERNER KOLHÖRSTER
INVENTOR
By *Otto Munk*
*his* Attorney.

Patented Oct. 31, 1933

1,933,063

UNITED STATES PATENT OFFICE 1,933,063

DEVICE FOR DETERMINING THE PERCENTAGE OF POTASSIUM IN CHAMBERS CONTAINING POTASSIUM

Werner Kolhörster, Berlin-Friedenau, Germany

Application August 30, 1929, Serial No. 389,369, and in Germany May 7, 1928

1 Claim. (Cl. 23—253)

I have filed applications in Germany, May 7, 1928, No. R—109,394, and July 15, 1929, No. K—115,762; Spain, July 16, 1929, No. 114,008; Italy, July 14, 1929, No. 78/64; France, July 27, 1929, No. 279,460; Russia, July 24, 1929, No. 51,670; and Poland, July 17, 1929, No. P—27,538.

The present invention relates to an apparatus for determining the potassium content in spaces which contain potassium compounds in any state of aggregation whatsoever. Determinations of this nature are frequently necessary in technics, as for instance when searching for deposits of potassium salts, for the purpose of ascertaining whether or not certain rock strata are worth exploiting, for the purpose of testing the prepared salts for their potassium content and, finally, for the purpose of being able to determine the potassium content in the intermediate and final products obtained from these salts. The present process also comes into account for the determination of the potassium content in the beds of other minerals containing potassium, or in the rock (leucite, etc.), and products won from these minerals, as also for the determination of the potassium content in mother liquors of sea salines, of sea salts (Searles Sea) or in other salt solutions used for utilizing the potassium content. Further, in order to be able to determine the productivity of land, the determination of the potassium content of such land must also be taken into consideration. More particularly with a view to ascertaining whether or not the potassium content available is sufficient for the support of the plants to be cultivated on the land, and on the occasion arising, to ascertain the quantity of potash fertilizers necessary to make up for any deficiency of potassium. Hitherto, determinations of this nature have been effected either by taking a sample of the rock from the ground to be tested and ascertaining the potassium content thereof by chemical analysis, or else the quantity of potassium absorbed by the plants during tests was ascertained after ashing. The defects of methods of this kind are to be found in the difficulty entailed in obtaining a satisfactory sample of the ground and in the considerable expenditure of time necessary for determining the potassium content. When searching for deposits of potash salt it is altogether impossible to take a sample, and it is likewise difficult to obtain a satisfactory sample when determining whether or not the deposits are worth exploiting. In addition to this, it is nearly always difficult to carry out the chemical analysis on the spot where the sample was lifted, which means that further delays ensue until the results of the chemical analysis are available for criticism. The speed at which the determination of potassium can be carried out is nevertheless an important factor, and more particularly so when the matter extracted from the mine, or the supply of any product, is to be controlled with regard to a definite potassium content.

By means of the present invention a novel process is created by means of which it becomes possible to determine with the aid of a few measurements the total potassium content of a fairly large area which contains potassium compounds in a solid or in a dissolved state, even in cases where the observer is separated from this area by means of walls, or by layers of other rock. The present invention is based on the recent knowledge gained to the effect that the potassium atom emits extraordinary gamma rays, the penetration of which is about two or three times greater than that of radium C. The rays emitted by a large number of potassium atoms are thus sufficiently strong to set up in a suitable measuring vessel an ionization the strength of which can be measured in a very easy manner by means of a suitable device and which constitutes directly a measure of the specific potassium content of the area surrounding the measuring station. One special advantage of the present process is to be found in the speed at which the potassium content can be determined. In accordance with the present process, this determination is effected in approximately only one-tenth of the time required when using the methods of determination hitherto employed, even in the most favorable circumstances, counting from the time the sample was lifted. In addition to this, the measurements can be carried out on the spot.

I will first of all proceed to the description of the means and contrivance for taking these measurements and which are comprised essentially in a vessel containing a highly sensitive electrometer, the vessel being subjected to the rays which have to be measured. The measurement is hereby effected in such a manner that the electrometer is at the commencement of the measuring process charged with a certain quantity of electricity by being connected up to a pressure. The radiation of the potassium affecting the measuring vessel sets up an ionization of the gaseous space enclosed in the measuring vessel by means of which the electrometer is discharged according to the strength of the ionization. The electrometer can be calibrated in such a way that by observing the drop in pressure set up in a definite period of time and multiplying by a calibration coefficient the number of ions per cubic metre and second, that is to say, the strength of the radiation, can be found.

If $q$ be the strength of the radiation, $K$ the calibration co-efficient and $s$ the potassium content per gramme, then the resultant potassium content per gramme of the radiating surroundings is $s = K.q$.

The properties demanded of a measuring device of this kind are first and foremost the following:—

1. The capacity of the electrometer should be very small, if at all possible less than 1 cm.
2. The radiation of the walling of the vessel should be small.
3. There should be no sensitivity with regard to variations of atmospheric pressure.
4. The electrometer should not be sensitive to the influences of temperature.
5. The sealing of the vessel should be gas-tight.

The last mentioned properties must first and foremost be demanded when the measurements are to be taken below ground, as for instance in a mine, or in the open air, because it is not possible in these circumstances to avoid variations in temperature and pressure of the surroundings.

A high sensitivity of the electrometer combined with the smallest capacity can be attained by means of an arrangement in which one or two U-shaped quartz threads, which serve the purpose of movable electrodes, are secured on an insulated carrier in the centre of a closed metal vessel. The vessel can be made of iron or of any other metal that possesses little natural radiation. In order to form the electrical field which is set up between the metal casing and the quartz threads as uniformly as possible, the casing is suitably given a spherical form at the centre point of which the electrometer is arranged.

One form of a measuring device of this nature is shown diagrammatically in detail in Figures 1 and 2. Figure 1 is a section through the measuring vessel which is spherical in shape, Figure 2 is a diagrammatic view of the electrometer and Figure 3 is a diagrammatic view of a modified form of the device.

With reference to Figure 1, 1 is the wall of the vessel, 2 is a microscope projecting into the interior of the vessel and which is used for the purpose of observing the deflection of the electrometer. Inside the microscope and attached in the known way is a transparent scale (an ocular micrometer) not shown in Fig. 1 of the drawing, and by means of which the deflection of the electrometer can be measured from time to time. The carrier 3 (which is made of quartz) of the electrometer 5 is attached to the microscope by means of a clip 4. The details of the electrometer are shown more particularly in Figure 2. In order, as above described, to impart a charge to the electrometer before commencing the measurement process, provision is made for a rotatable probe 6 which by means of the knob 7 can be brought into contact with the electrometer for the purpose of charging the latter. This probe is insulated from the casing 1 by means of an insulating tube 8. At a point in the casing lying opposite to the object glass of the microscope is provided a window 9 which affords the illumination necessary for observing the electrometer.

Figure 2 gives a diagrammatic representation of the electrometer which is attached to the quartz tube 3. It consists of two approximately U-shaped quartz threads 12 and 13, which are secured to a metal carrier 10, 11. As soon as the metal carrier 10, 11, assumes a pressure relatively to the measuring vessel, the quartz threads, owing to the effect of the electrical forces, repel each other to a greater or smaller extent, so that on the transparent scale 14 which is built into the microscope appear two shadow lines 12' and 13' which are at a certain distance one from the other. Given suitable dimensions, an electrometer of this nature possesses relatively to the casing a capacity which is considerably less than 1 cm. The measuring process is continued in such manner that with the aid of the probe 6 a definite tension of, say for instance, 200 volts relatively to the casing is imparted to the electrometer. This tension drops (in consequence of the ionization which is set up in the interior of the vessel by the action of the potassium ray which is to be measured) after a certain time to a certain amount, so that, in the manner above described, the strength of radiation $q$ can be read off at two points and from this the specific potassium content of the radiating surroundings can be found.

The higher the gas pressure used and the tighter it is, the greater will be the ionization of the gaseous space enclosed in the vessel. For this reason, the vessel must be filled with gas at an increased pressure in order to obtain as strong an ionization as possible. The success of this step has been confirmed by tests taken with pressures up to fifty atmospheres. The gas used can be nitrogen, air, carbonic acid, etc. The most suitable has been found to be sulphur hexa-fluoride ($SF_6$) which is five times heavier than air and is besides chemically inert and, like nitrogen, odorless. A further advantage of this gas is found in the circumstance that it is completely non-hygroscopic and is not dissociated by spark discharges. Of course, instead of observing the deflections of the electrometer with the naked eye, the deflections can also be photographically recorded by a moving strip of film.

If instead of carrying out the measurements by reading off the measuring instruments it may be desired to take measurements which are automatically recorded, it will nevertheless be found more suitable to use an arrangement such as is shown diagrammatically in Figure 3, where 15 is a metal tube which is sealed at both ends by means of covers 16 which are made of some insulating material. A wire 18 passes right through this tube. By means of a battery 19 a continuous current pressure of about 1000 to 2000 volts is set up between the wire 18 and the tube 15, and in such a way that the tube is charged negatively relatively to the wire. In addition to this there is connected up in the circuit a high ohmic resistance 20 which is itself connected to the grid of an electrode valve. In the anode circuit of this amplifying valve is a relay 22 by means of which in the known way the impulses reaching the grid of the valve are recorded on a uniformly moving recording strip or which can be added together directly with the aid of a counting mechanism (hodometer). The operation of this arrangement is as follows. An ionization is set up inside the tube 15 by every gamma ray of potassium acting on that tube. The consequent free electrons are accelerated in such a way (owing to the influence of the electrical field) from the wall of the tube 15 towards the wire 18 that a percussion ionization ensues. Thus each and every time this passage takes place the current circuit which is fed by the battery 19 and in which otherwise only a weak current flows, is closed. The current impulse set up in this circuit is transmitted to the grid of the amplifying valve and after a corresponding amplification is recorded on the recording strip or counted by means of the counting mechanism. The radiation strength and with it the specific potassium of the radiation surroundings can thus be determined from the number of current impulses set up in any given time.

The applicability of the present invention has been proved on various occasions when it was put to practical use. Thus, for example, in the case of a German potassium mine, the potassium content of three different strata of the deposits was determined. In this instance, and working in accordance with the process as above described with a measuring vessel of a capacity of two litres, 12.6%, 13.5% and 8.7% of potassium was found, whilst the analyses by weight taken in the usual way of samples of rock showed 12.7%, 13.3% and 8.9% of potassium. This astonishingly satisfactory result has been confirmed by a large number of determinations and has even proved more satisfactory in the case of manufactured potassium products.

I claim:—

Device for ascertaining the contents of potassium by means of gamma-rays emitted by the potassium, consisting of a spherical measuring vessel filled with a gas, a quartz-coiled electrometer arranged approximately in the centre of said spherical vessel, the U-shaped bent electrodes of which have a small extension compared with the diameter of the spherical vessel, charging means usable externally to give to the electrometer a charge opposite the walls of the vessel, a window in the latter, and a microscope provided in the walls of the vessel for the purpose of observing the deflection of the electrometer.

WERNER KOLHÖRSTER.